(12) United States Patent
Hanke et al.

(10) Patent No.: US 7,420,771 B1
(45) Date of Patent: Sep. 2, 2008

(54) DISK DRIVE WITH COVER INCLUDING A METAL LAYER AND A POLYMER LAYER WITH A POLYMER LAYER FEATURE

(75) Inventors: Frederick J. Hanke, Newark, CA (US); Wayne M. Yamada, San Jose, CA (US); Norman Watkins, Gilroy, CA (US); David Ali, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 388 days.

(21) Appl. No.: 11/032,940

(22) Filed: Jan. 11, 2005

(51) Int. Cl.
*G11B 5/012* (2006.01)
*G11B 33/14* (2006.01)
(52) U.S. Cl. .................... 360/97.01; 360/97.02
(58) Field of Classification Search .... 360/97.01–97.04
See application file for complete search history.

(56) References Cited

U.S. PATENT DOCUMENTS

| | | | |
|---|---|---|---|
| 4,491,888 A | 1/1985 | Brown et al. | |
| 5,150,267 A | 9/1992 | Reinisch | |
| 5,214,549 A * | 5/1993 | Baker et al. ............. | 360/97.02 |
| 5,282,100 A | 1/1994 | Tacklind et al. | |
| 5,510,954 A | 4/1996 | Wyler | |
| 5,598,306 A | 1/1997 | Frees et al. | |
| 5,666,239 A | 9/1997 | Pottebaum | |
| 5,982,580 A | 11/1999 | Woldemar et al. | |
| 6,177,173 B1 * | 1/2001 | Nelson ....................... | 428/137 |
| 6,256,163 B1 | 7/2001 | Schmidt et al. | |
| 6,288,866 B1 | 9/2001 | Butler et al. | |
| 6,377,420 B1 | 4/2002 | Tadepalli et al. | |
| 6,407,879 B1 | 6/2002 | Fruge et al. | |
| 6,469,864 B2 | 10/2002 | Kamezawa et al. | |
| 6,498,700 B2 | 12/2002 | Takahashi et al. | |
| 6,501,614 B1 | 12/2002 | Kang et al. | |
| 6,501,615 B1 | 12/2002 | Kelsic et al. | |
| 6,525,931 B2 | 2/2003 | Yagenji et al. | |
| 6,529,345 B1 | 3/2003 | Butler et al. | |
| 6,621,658 B1 * | 9/2003 | Nashif ...................... | 360/97.02 |
| 6,661,603 B1 | 12/2003 | Watkins et al. | |
| 6,724,566 B2 | 4/2004 | Kant et al. | |
| 6,950,275 B1 | 9/2005 | Ali et al. | |
| 7,199,970 B2 | 4/2007 | Boss et al. | |
| 2001/0028525 A1 | 10/2001 | Lofstrom et al. | |

(Continued)

FOREIGN PATENT DOCUMENTS

JP          10207571 A         8/1998

(Continued)

*Primary Examiner*—A. J. Heinz
(74) *Attorney, Agent, or Firm*—Barcelo & Harrison, LLP

(57) ABSTRACT

A disk drive includes a disk drive base, a disk rotatably coupled to the disk drive base having a disk surface, a head stack assembly rotatably coupled to the disk drive base adjacent the disk surface, and a cover attached to the disk drive base enclosing the disk and head stack assembly there between. The cover includes a metal layer and a polymer layer substantially coextensive with the metal layer and extending substantially across the disk drive base. The polymer layer includes a polymer layer feature extending away from the metal layer towards the disk drive base. The polymer layer feature defines a cavity between the polymer layer and the metal layer.

34 Claims, 5 Drawing Sheets

U.S. PATENT DOCUMENTS

| | | |
|---|---|---|
| 2001/0038509 A1 | 11/2001 | Lofstrom et al. |
| 2002/0001155 A1 | 1/2002 | Takahashi et al. |
| 2002/0141108 A1 | 10/2002 | Daniel et al. |
| 2003/0058572 A1 | 3/2003 | Kant et al. |
| 2005/0088777 A1* | 4/2005 | Chee et al. ............... 360/97.01 |

FOREIGN PATENT DOCUMENTS

| | | |
|---|---|---|
| JP | 11232832 A | 8/1999 |
| JP | 200049471 A | 2/2000 |
| JP | WO 0173788 A1 | 3/2000 |
| JP | 2001216774 A | 8/2001 |
| JP | 2002157858 A | 5/2002 |
| WO | WO 9600964 A1 | 1/1996 |

\* cited by examiner

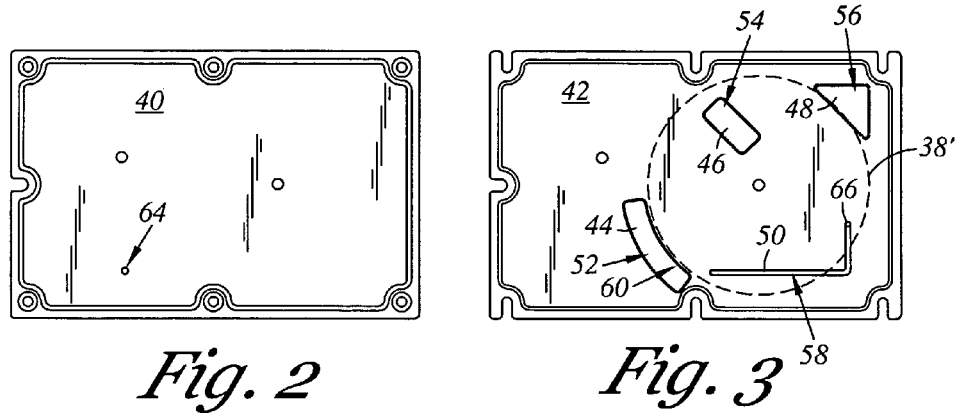
*Fig. 2*  *Fig. 3*
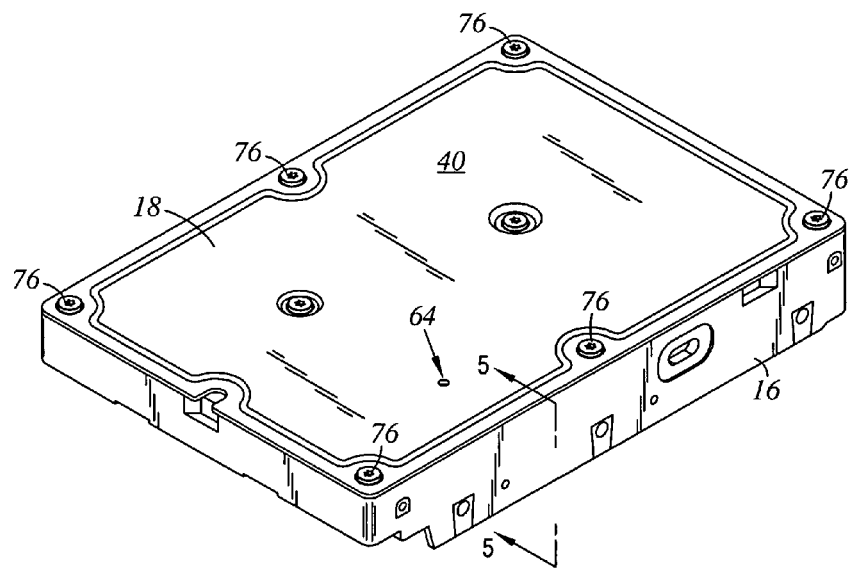
*Fig. 4*

DISK DRIVE WITH COVER INCLUDING A METAL LAYER AND A POLYMER LAYER WITH A POLYMER LAYER FEATURE

BACKGROUND OF THE INVENTION

1. Field of the Invention

The present invention relates generally to disk drives, and in particular to a disk drive with a cover including a metal layer and a polymer layer with a polymer layer feature.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider for reading and writing data from and to the disk.

The cover is typically formed of a metal material, such as stainless steel or aluminum. In this regard, such metals exhibit desired structural strength, are non-magnetic metals, and are considered to be generally clean materials with respect to shedding particles within the disk drive. The cover is engaged with the disk drive base with a plurality of screws. Adequate sealing of the cover and the disk drive base is critical in order to maintain a controlled internal environment of the disk drive. To facilitate sealing a gasket may be disposed between the cover and the disk drive base. A conventional gasket is a formed-in-place gasket (FIPG) that takes the form of a solid bead of an elastomer material disposed generally about a periphery of the cover. The material may be dispensed upon the cover in a liquid form that is subsequently cured. The screws are torqued so as to compress the gasket in order to achieve an adequate seal.

There is a need in the art for a cover configuration for use with a disk drive in comparison to the prior art.

SUMMARY OF THE INVENTION

According to an aspect of the present invention, there is provided a disk drive. The disk drive includes a disk drive base. The disk drive further includes a disk rotatably coupled to the disk drive base. The disk includes a disk surface. The disk drive further includes a head stack assembly rotatably coupled to the disk drive base adjacent the disk surface. The disk drive further includes a cover attached to the disk drive base enclosing the disk and head stack assembly there between. The cover includes a metal layer and a polymer layer substantially coextensive with the metal layer and extending substantially across the disk drive base. The polymer layer includes a polymer layer feature extending away from the metal layer towards the disk drive base. The polymer layer feature defines a cavity between the polymer layer and the metal layer.

According to various embodiments, the polymer layer may be separately formed from the metal layer. In another embodiment, the polymer layer may be formed upon the metal layer. The disk includes an outer edge and the polymer layer feature may define a disk shroud segment extending along the outer edge of the disk. The polymer layer feature may be disposed adjacent the disk surface. The head stack assembly may include an actuator arm disposed along the disk surface with the polymer layer feature disposed upstream of the actuator arm for diverting disk rotation induced airflow from the actuator arm. The disk drive may include an air filter disposed within the disk drive base, and the polymer layer feature is disposed adjacent the air filter for diverting disk rotation induced airflow through the air filter.

The metal layer may include a first filter hole and the polymer layer feature may include a second filter hole extending through the polymer layer at the cavity. The first and second filter holes may extend to the cavity with the cavity defining a passageway to form a labyrinth filter. The cover may include damping material disposed between the metal layer and the polymer layer. The damping material may be disposed in the cavity. A gasket may be disposed between the cover and the disk drive base. In an embodiment, the gasket is in direct contact with the disk drive base and the polymer layer. In another embodiment, the gasket is in direct contact with the disk drive base and the metal layer. The polymer layer may be laterally surrounded by the gasket.

According to another aspect of the present invention, there is provided a cover for a disk drive. The cover is as described above.

BRIEF DESCRIPTION OF THE DRAWINGS

FIG. 2 is an enlarged bottom plan view of a metal layer of the cover of FIG. 1;

FIG. 3 is an enlarged bottom plan view of a polymer layer of the cover of FIG. 1 (with an outer disk edge indicated in dashed line);

FIG. 4 is an enlarged top perspective view of the disk drive of FIG. 1 as assembled;

DESCRIPTION OF THE PREFERRED EMBODIMENTS

Figure 1:
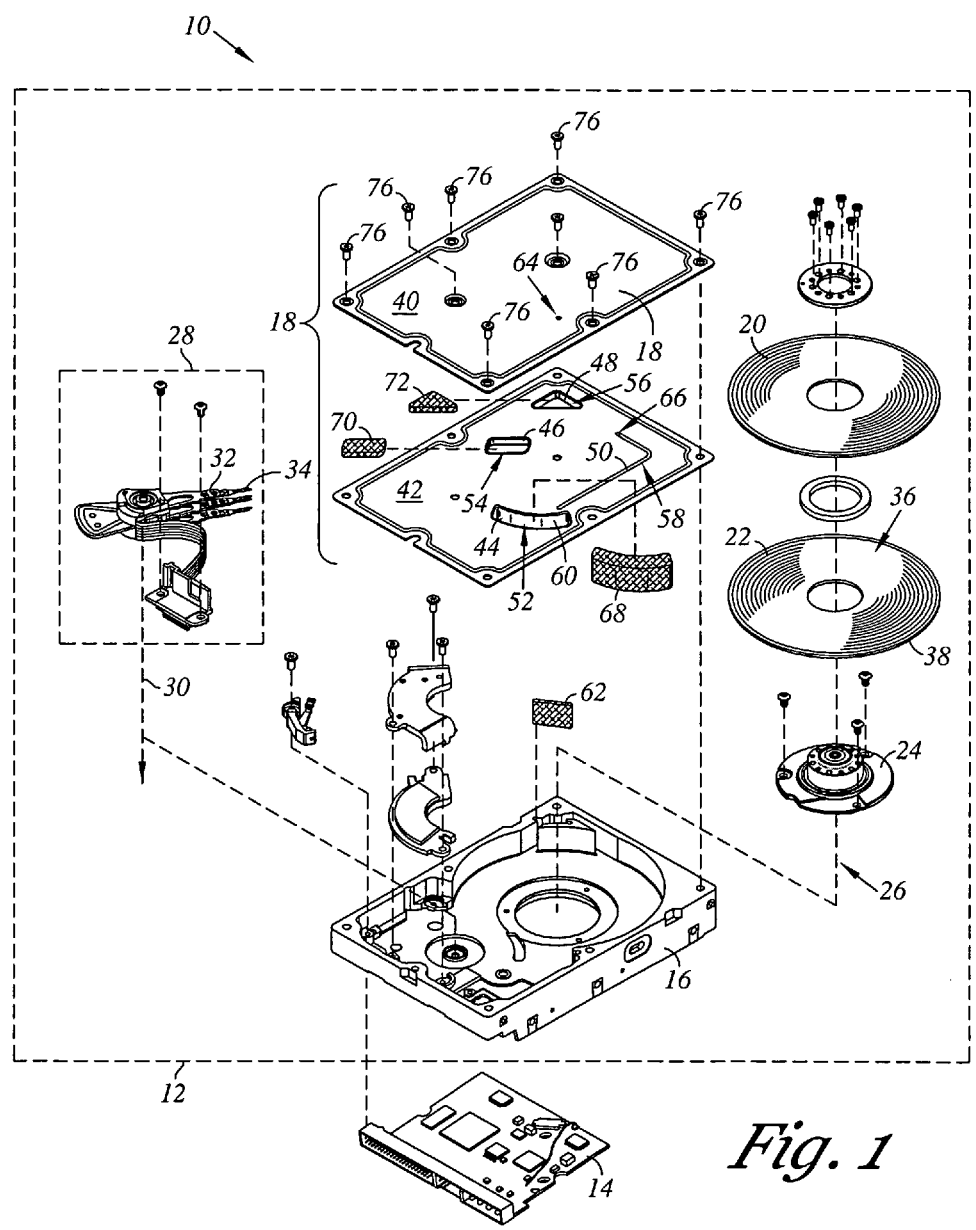
FIG. 1 is an exploded top perspective view of a disk drive including a cover of an aspect of the present invention.

Referring now to the drawings wherein the showings are for purposes of illustrating preferred embodiments of the present invention only, and not for purposes of limiting the same, FIGS. 1-11 illustrate a disk drive including a cover in accordance with aspects of the present invention.

Figure 6:
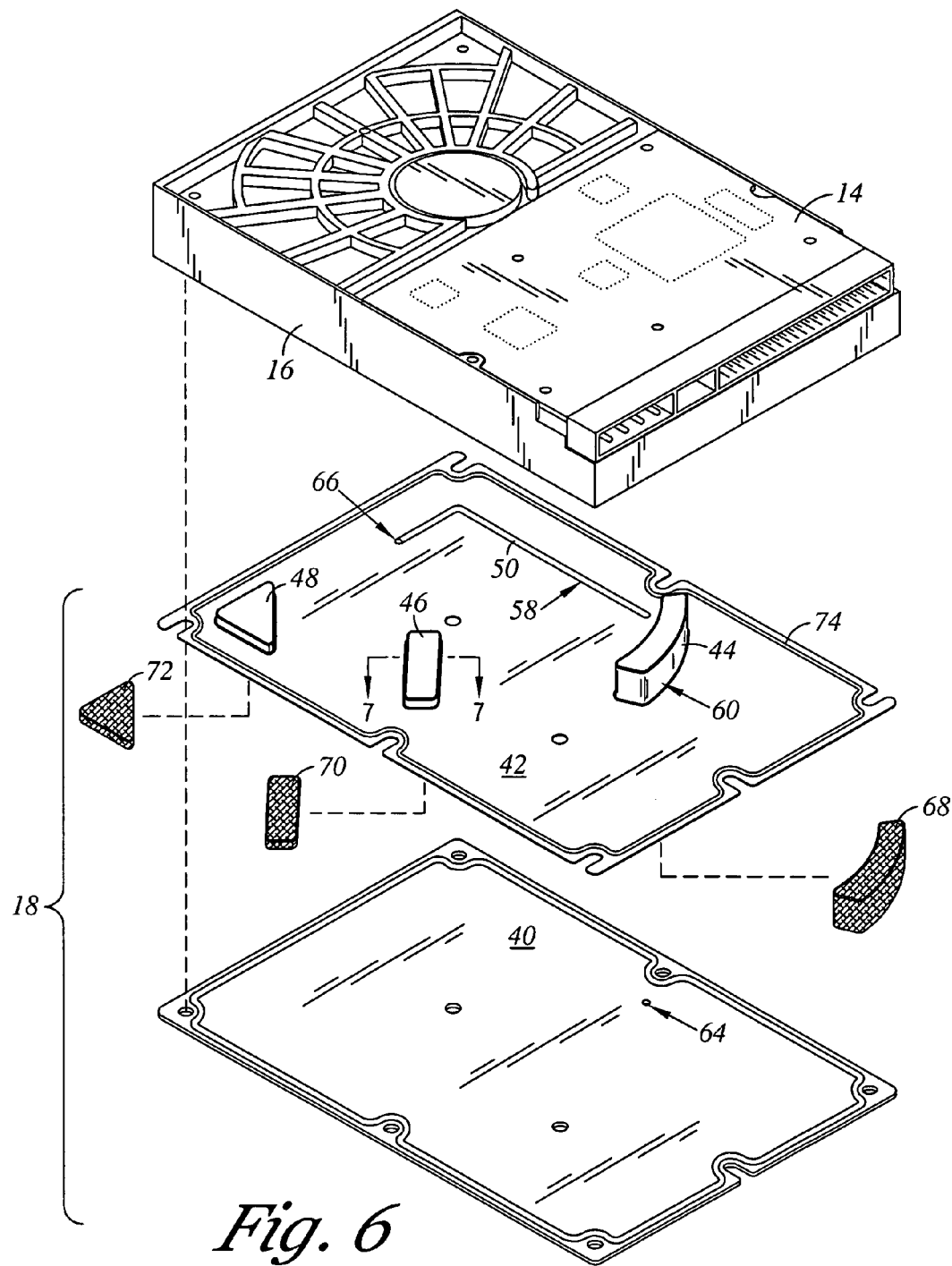
FIG. 6 is an exploded bottom perspective view of the disk drive.

Referring now to FIG. 1 there is depicted an exploded perspective view of a disk drive 10 constructed in accordance with an aspect of the present invention. FIG. 4 is an enlarged top perspective view of the disk drive 10 of FIG. 1 as assembled. FIG. 6 is an exploded bottom perspective view of the disk drive 10.

In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22. Each magnetic disk 20, 22 contains a plurality of magnetic tracks for storing data.

The head disk assembly 12 further includes a spindle motor 24 for rotating the magnetic disks 20, 22 about an axis of rotation 26. The head disk assembly 12 further includes a head stack assembly 28 that rotates between limited positions about a pivot axis 30. The head stack assembly 28 includes a plurality of actuator arms, the uppermost one of which being denoted 32. A plurality of air bearing sliders, the uppermost one being denoted 34, are distally supported by the actuator arms 32 respectively adjacent the disks 20, 22. Each air bearing slider 34 includes a transducer head for reading and writing data from and to the disks 20, 22.

According to an aspect of the present invention, there is provided the disk drive 10. The disk drive 10 includes the disk drive base 16. The disk drive 10 further includes a disk, such as disk 20, rotatably coupled to the disk drive base 16. The disk 20 includes a disk surface 36 (which is the upper facing surface in the view of FIG. 1) and an outer edge 38. The disk drive 10 further includes the head stack assembly 28 rotatably coupled to the disk drive base 16 adjacent the disk surface 36. The disk drive 10 further includes the cover 18 attached to the disk drive base 16 enclosing the disk 20 and head stack assembly 28 there between. The cover 18 includes a metal layer 40 and a polymer layer 42 substantially coextensive with the metal layer 40 and extending substantially across the disk drive base 16. FIG. 2 is an enlarged bottom plan view of the metal layer 40 of the cover 18 of FIG. 1. FIG. 3 is an enlarged bottom plan view of the polymer layer 42 of the cover 18 of FIG. 1 (with the disk outer edge indicated in dashed line and denoted 38').

The polymer layer 42 includes a polymer layer feature extending away from the metal layer 40 towards the disk drive base 16. In the particular embodiment shown, the polymer layer 42 includes four such polymer layer features, a first polymer layer feature 44, a second polymer layer feature 46, a third polymer layer feature 48, and a fourth polymer feature 50. The polymer layer feature defines a cavity between the polymer layer 42 and the metal layer 40. In the particular embodiment shown, as best seen in FIGS. 1 and 3, each of the first, second, third and fourth polymer features 44, 46, 48, 50 respectively define first, second, third, and fourth cavities 52, 54, 56, 58 between the polymer layer 42 and the metal layer 40.

According to various embodiments, the metal layer 40 may be formed of a variety of metals, such as stainless steel or aluminum. The polymer layer 42 may be formed of a variety of polymer materials such as thermalset of thermoplastic materials. It is contemplated that the polymer layer 42 being formed of a polymer material is a relatively clean material with respect to exposure to the internal environment of the disk drive 10. In this regard, the polymer layer 42 may be utilized in place of certain e-coatings. Moreover, because of the polymer nature of the polymer layer 42, it is contemplated that the particular geometries of the polymer layer 42 may be changed as various design requirements are presented.

The polymer layer 42 may be separately formed from the metal layer 40. In this regard, the polymer layer 42 may be attached to the metal layer 40 by gluing or a heat stake process for examples. In another arrangement the polymer layer 42 may be formed upon the metal layer 40. As such, the polymer layer 42 may take the form of a vacuum formed polymer layer coating for example. Further, the polymer layer 42 may be held in place through the use of fasteners either directly, or with fasteners engaged with the metal layer 40 and the disk drive base 16 with the polymer layer 42 secured there between. The metal layer 40 may have a variety of thicknesses such as about 0.02 inches. The polymer layer 42 may have a variety of thicknesses such as about 0.01 to 0.02 inches for example.

As mentioned above, the polymer layer 42 is substantially coextensive with the metal layer 40. As used herein, substantially coextensive refers to the polymer layer 42 being disposed adjacent the metal layer 40 in generally parallel arrangement. As further mentioned above, the polymer layer 42 extends substantially across the disk drive base 16. In this regard, extending substantially across the disk drive base 16 refers to the polymer layer 42 covering at least a majority of the disk drive base 16.

In the embodiment shown, the first polymer layer feature 44 defines a disk shroud segment 60 extending along the outer edge 38 of the disk 20. The disk shroud segment 60 extends downwards from the cover 18 towards the disk drive base 16 below the disk surface 36. The second polymer layer feature 46 is disposed adjacent the disk surface 36. In this regard, the second polymer layer feature 46 is vertically disposed over the disk surface 36. The second polymer layer feature 46 is disposed upstream of the actuator arm 32 for diverting disk rotation induced airflow from the actuator arm 32. As seen in FIG. 1, the disk drive 10 may further include an air filter 62 disposed within the disk drive base 16. The third polymer layer feature 48 is disposed adjacent the air filter 48 for diverting disk rotation induced airflow through the air filter 62. The first, second, and third polymer layer features 44, 46, 48 are shown by way of example only. As such, other geometries, sizes and shapes may be utilized to achieve the desired airflow properties.

Advantageously, it is contemplated that the first, second, and third polymer layer features 44, 46, 48 can be formed are utilized in the disk drive 10 without the need for any localized attachment to the cover 18 due to the integrated nature of the first, second, and third polymer layer features 44, 46, 48 with the polymer layer 42. As such, the present invention avoids use of such attachment mechanisms like adhesives, which may present contamination problems within the disk drive 10.

In the embodiment shown, the metal layer 40 includes a first filter hole 64 and the fourth polymer layer feature 50 includes a second filter hole 66 extending through the polymer layer 42 at the fourth cavity 58. The first and second filter holes 64, 66 may extend to the fourth cavity 58 with the fourth cavity 58 defining a passageway to form a labyrinth filter. Although the fourth cavity 58 is formed in generally two long segments arranged at a right angle, other geometries, sizes and shapes may be utilized including a spiral configuration for example. The versatile nature of the polymer layer 42 is contemplated to facilitate construction of relatively very long and/or very wide dimensions so as to achieve the desired humidity time constraints. The configuration of the fourth polymer feature 50 and the first and second filter holes 66 to form the labyrinth filter is contemplated to be chosen from those which are well know to one of ordinary skill in the art.

The cover 18 may include damping material disposed between the metal layer 40 and the polymer layer 42. In this regard, damping material inserts 68, 70, 72 may be respectively disposed in the cavities 52, 54, 56. Though not shown the damping material may be disposed in other areas between the metal layer 40 and the polymer layer 42 besides in the cavities 68, 70, 72. Thus, it may also take the form of thin sheet segments as well. The damping material may be utilized to attenuate acoustic and/or mechanical vibration for examples. The damping material may be formed of a variety of materials, such as a viscoelastic, a foam, or a rubber material for examples, as well as any of those materials chosen from those which are well know to one of ordinary skill in the art. In addition, the damping material may take the form of an adhesive material that may be utilized for damping as well as attachment of the polymer layer 42 to the metal layer 40.

Figure 5:
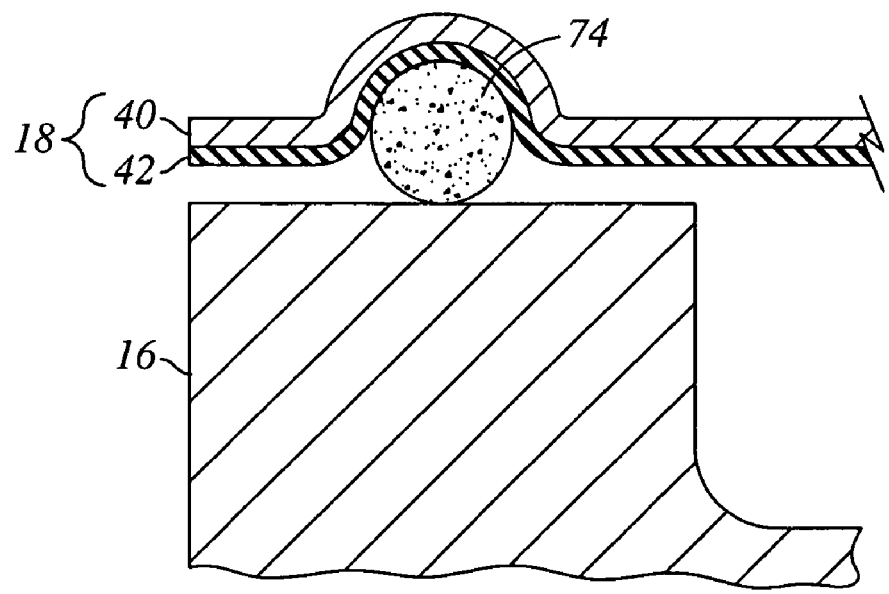
FIG. 5 is an enlarged cross-sectional view of the cover and a disk drive base of the disk drive as seen along axis 5-5 of FIG. 4, however, shown just before final attachment engagement of the cover to the disk drive base and compression of a gasket.
Figure 7:
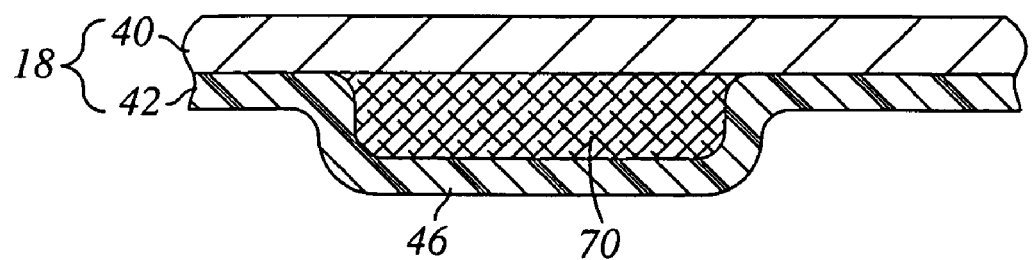
FIG. 7 is an enlarged cross-sectional view of the cover of the disk drive as seen along axis 7-7 of FIG. 6.

A gasket 74 may be disposed between the cover 18 and the disk drive base 16. Referring now to FIG. 5 there is depicted an enlarged cross-sectional view of the cover 18 and the disk drive base 16 as seen along axis 5-5 of FIG. 4, however, shown just before final attachment engagement of the cover 18 to the disk drive base 16 and compression of the gasket 74. The gasket 74 may be formed of a urethane acrylate material or a silicon material for examples. Additionally, other materials and techniques used to form the gasket 74 may be chosen from those that are well known to one of ordinary skill in the art. The gasket 74 may be separately formed from the cover 18 or a formed-in-place gasket (FIPG). Being formed-in-place refers to the gasket 74 being formed at a location in relation to the cover 18 and/or the disk drive base 16 where the gasket 74 is intended to be disposed during installation. The gasket 74 may be formed upon either the disk drive base 16 or the cover 18. In the example shown, the gasket 74 is formed upon the cover 18. In particular, the gasket 74 is formed upon the polymer layer 42.

The cover 18 may be provided with a plurality of fasteners 76 which are used to attach the cover 18 to the disk drive base 16. Upon final installation, the fasteners 76 are fully engaged which would compress the gasket 74 from its rounded cross-section of FIG. 5, for providing a tight seal between the cover 18 and the disk drive base 16.

According to another aspect of the present invention, there is provided the cover 18 for the disk drive 10. The cover 18 is as described above.

Figure 8:
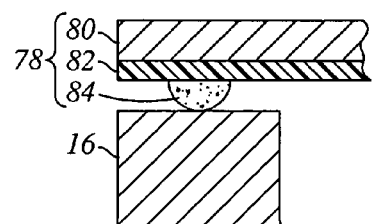
FIG. 8 is an enlarged cross-sectional view of a cover and the disk drive base similar to the view of FIG. 5, however, according to another embodiment with a gasket formed directly upon the polymer layer of the cover.

Referring now to FIG. 8 there is depicted another embodiment of a cover 78 generally similar to the cover 18, however, with the differences noted. FIG. 8 depicts an enlarged cross-sectional view of the cover 78 with the disk drive base 16 similar to the view of FIG. 5. The cover 78 includes a metal layer 80 and a polymer layer 82. In this embodiment, there is provided a gasket 84 formed directly upon a flat surface of the polymer layer 82.

Figure 9:
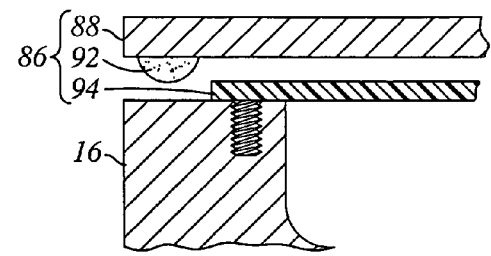
FIG. 9 is an enlarged cross-sectional view of a cover and the disk drive base similar to the view of FIG. 5, however, according to another embodiment with a gasket formed directly upon the metal layer of the cover.

Referring now to FIG. 9 there is depicted another embodiment of a cover 86 generally similar to the cover 18, however, with the differences noted. FIG. 9 depicts an enlarged cross-sectional view of the cover 86 with the disk drive base 16 similar to the view of FIG. 5. The cover 86 includes a metal layer 88 and a polymer layer 90. In this embodiment, there is provided a gasket 92 formed directly upon a flat surface of the metal layer 88. It is contemplated that the polymer layer 90 is laterally surrounded by the gasket 92 so as to provide a complete seal about the disk drive base 16.

Figure 10:
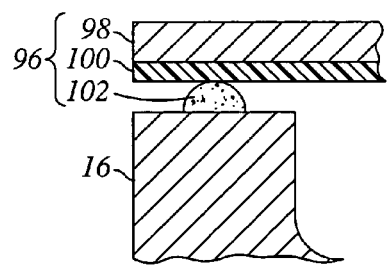
FIG. 10 is an enlarged cross-sectional view of a cover and the disk drive base similar to the view of FIG. 5, however, according to another embodiment with a gasket formed directly upon the disk drive base in contact with the polymer layer.

Referring now to FIG. 10 there is depicted another embodiment of a cover 96 generally similar to the cover 18, however, with the differences noted. FIG. 10 depicts an enlarged cross-sectional view of the cover 96 with the disk drive base 16 similar to the view of FIG. 5. The cover 96 includes a metal layer 98 and a polymer layer 100. In this embodiment, there is provided a gasket 102 formed directly upon the disk drive base 16. The gasket 102 is disposed in direct contact with the polymer layer 100 upon installation.

Figure 11:
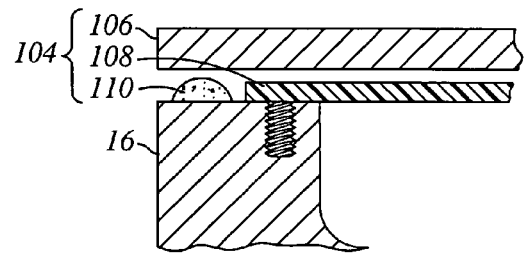
FIG. 11 is an enlarged cross-sectional view of a cover and the disk drive base similar to the view of FIG. 5, however, according to another embodiment with a gasket formed directly upon the disk drive base in contact with the metal layer.

Referring now to FIG. 11 there is depicted another embodiment of a cover 104 generally similar to the cover 18, however, with the differences noted. FIG. 11 depicts an enlarged cross-sectional view of the cover 104 with the disk drive base 16 similar to the view of FIG. 5. The cover 104 includes a metal layer 106 and a polymer layer 108. In this embodiment, there is provided a gasket 110 formed upon the disk drive base 16. The gasket 110 is disposed in direct contact with the metal layer 106 upon installation. It is contemplated that the polymer layer 108 is laterally surrounded by the gasket 110 so as to provide a complete seal about the disk drive base 16.

We claim:

1. A disk drive comprising:
   a disk drive base;
   a disk rotatably coupled to the disk drive base, the disk including a disk surface;
   a head stack assembly rotatably coupled to the disk drive base adjacent the disk surface; and
   a cover attached to the disk drive base enclosing the disk and head stack assembly there between, the cover including:
      a metal layer; and
      a polymer layer substantially coextensive with the metal layer and extending substantially across the disk drive base, the polymer layer including a polymer layer feature extending away from the metal layer towards the disk drive base, the polymer layer feature defining a cavity between the polymer layer and the metal layer.

2. The disk drive of claim 1 wherein the polymer layer is separately formed from the metal layer.

3. The disk drive of claim 1 wherein the polymer layer is formed upon the metal layer.

4. The disk drive of claim 1 wherein the disk includes an outer edge, the polymer layer feature defines a disk shroud segment extending along the outer edge of the disk.

5. The disk drive of claim 1 wherein the polymer layer feature is disposed adjacent the disk surface.

6. The disk drive of claim 5 wherein the head stack assembly includes an actuator arm disposed along the disk surface, the polymer layer feature is disposed upstream of the actuator arm for diverting disk rotation induced airflow from the actuator arm.

7. The disk drive of claim 1 further includes an air filter disposed within the disk drive base, the polymer layer feature is disposed adjacent the air filter for diverting disk rotation induced airflow through the air filter.

8. The disk drive of claim 1 wherein the metal layer includes a first filter hole and the polymer layer feature includes a second filter hole extending through the polymer layer at the cavity, the first and second filter holes extend to the cavity with the cavity defining a passageway to form a labyrinth filter.

9. The disk drive of claim 1 wherein the cover includes damping material disposed between the metal layer and the polymer layer.

10. The disk drive of claim 1 wherein the damping material is disposed in the cavity.

11. The disk drive of claim 1 wherein a gasket is disposed between the cover and the disk drive base.

12. The disk drive of claim 11 wherein the gasket is in direct contact with the disk drive base and the polymer layer.

13. The disk drive of claim 11 wherein the gasket is in direct contact with the disk drive base and the metal layer.

14. The disk drive of claim 13 wherein the polymer layer is laterally surrounded by the gasket.

15. A cover for use with a disk drive, the disk drive including a disk drive base and a disk rotatably coupled to the disk drive base, the disk including a disk surface, the cover comprising:
- a metal layer; and
- a polymer layer substantially coextensive with the metal layer and formed to extending substantially across the disk drive base, the polymer layer including a polymer layer feature extending away from the metal layer and extendable towards the disk drive base, the polymer layer feature defining a cavity between the polymer layer and the metal layer.

16. The cover of claim 15 wherein the polymer layer is separately formed from the metal layer.

17. The cover of claim 15 wherein the polymer layer is formed upon the metal layer.

18. The cover of claim 15 wherein the disk drive includes a disk with an outer edge, the polymer layer feature defines a disk shroud segment extendable along the outer edge of the disk.

19. The cover of claim 15 wherein the disk drive includes a disk with a disk surface, the polymer layer feature is disposable adjacent the disk surface.

20. The cover of claim 19 wherein the disk drive includes a head stack assembly with an actuator arm disposed along the disk surface, the polymer layer feature is disposable upstream of the actuator arm for diverting disk rotation induced airflow from the actuator arm.

21. The cover of claim 15 wherein the disk drive base includes an air filter disposed within the disk drive base, the polymer layer feature is disposable adjacent the air filter for diverting disk rotation induced airflow through the air filter.

22. The cover of claim 15 wherein the metal layer includes a first filter hole and the polymer layer feature includes a second filter hole extending through the polymer layer at the cavity, the first and second filter holes extend to the cavity with the cavity defining a passageway to form a labyrinth filter.

23. The cover of claim 15 wherein the cover includes damping material disposed between the metal layer and the polymer layer.

24. The cover of claim 15 wherein the damping material is disposed in the cavity.

25. The cover of claim 15 wherein a gasket is disposed upon the cover.

26. The cover of claim 25 wherein the gasket is in direct contact with the polymer layer.

27. The cover of claim 25 wherein the gasket is in direct contact the metal layer.

28. The cover of claim 27 wherein the polymer layer is laterally surrounded by the gasket.

29. A cover for use with a disk drive, the disk drive including a disk drive base and an internal environment, the cover comprising:
- a metal layer formed to extend substantially across the disk drive base; and
- a polymer layer disposed adjacent to the metal layer in a generally parallel arrangement, wherein the polymer layer is separately formed from the metal layer and wherein the polymer layer is a clean material relative to the internal environment of the disk drive;
- wherein the polymer layer has a thickness in the range 0.01 to 0.02 inches.

30. The cover of claim 29 further comprising glue that attaches the polymer layer to the metal layer.

31. The cover of claim 30 wherein the glue comprises an adhesive damping material disposed between the metal layer and the polymer layer.

32. The cover of claim 31 wherein the adhesive damping material takes the form of a thin sheet.

33. The cover of claim 29 further comprising at least one fastener that attaches the polymer layer to the metal layer.

34. The cover of claim 29 wherein the polymer layer is laterally surrounded by a gasket.

* * * * *